United States Patent
Li et al.

(10) Patent No.: US 10,637,790 B2
(45) Date of Patent: Apr. 28, 2020

(54) CONTROL METHOD AND APPARATUS, AND NETWORK CONTROLLER

(71) Applicant: HUAWEI TECHNOLOGIES CO., LTD., Shenzhen (CN)

(72) Inventors: Yong Li, Chongqing (CN); Dejian Li, Beijing (CN); Pei Liu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/045,708

(22) Filed: Jul. 25, 2018

(65) Prior Publication Data

US 2018/0331968 A1   Nov. 15, 2018

Related U.S. Application Data

(63) Continuation of application No. PCT/CN2016/072025, filed on Jan. 25, 2016.

(51) Int. Cl.
*H04L 12/823* (2013.01)
*H04L 1/18* (2006.01)
(Continued)

(52) U.S. Cl.
CPC .......... *H04L 47/323* (2013.01); *H04L 1/1614* (2013.01); *H04L 1/1854* (2013.01);
(Continued)

(58) Field of Classification Search
None
See application file for complete search history.

(56) References Cited

U.S. PATENT DOCUMENTS

2007/0253391 A1   11/2007   Shao et al.
2012/0151540 A1*  6/2012   Stanwood ............... H04L 65/00
                                                              725/109
(Continued)

FOREIGN PATENT DOCUMENTS

CN   101350915 A   1/2009
CN   101657996 A   2/2010
(Continued)

OTHER PUBLICATIONS

IEEE P802 11ah™/D5.0 Draft Standard for Information technology—Telecommunications and information exchange between systems Local and metropolitan area networks—Specific requirements, Part 11: Wireless LAN Medium Access Control (MAC) and Physical Layer (PHY) Specifications, Amendment 2: Sub 1 GHz License Exempt Operation. IEEE P802 11ah™/D5.0, Mar. 2015, 632 pages.

*Primary Examiner* — Brian S Roberts
(74) *Attorney, Agent, or Firm* — Kilpatrick Townsend & Stockton LLP

(57) ABSTRACT

The invention provide a control method, including: obtaining a time division scheme of a STA in a next cruise monitoring period, where the next cruise monitoring period includes N adjustment periods and N monitoring periods determined by means of division according to N preset points; configuring control information according to the time division scheme, where the control information is for controlling an operating status of the STA in each adjustment period in the next cruise monitoring period; and sending the control information to the STA.

27 Claims, 4 Drawing Sheets

(51) Int. Cl.
*H04L 5/00* (2006.01)
*H04L 1/16* (2006.01)
*H04W 28/06* (2009.01)
*H04W 72/04* (2009.01)
*H04N 7/18* (2006.01)

(52) U.S. Cl.
CPC .......... *H04L 1/1896* (2013.01); *H04L 5/0053* (2013.01); *H04W 28/06* (2013.01); *H04W 72/0406* (2013.01); *H04W 72/0446* (2013.01); *H04L 5/0055* (2013.01); *H04L 5/0094* (2013.01); *H04N 7/18* (2013.01)

(56) References Cited

U.S. PATENT DOCUMENTS

| | | | |
|---|---|---|---|
| 2013/0326551 A1* | 12/2013 | Chatterjee | H04W 24/10 725/9 |
| 2014/0341207 A1 | 11/2014 | Bhushan et al. | |
| 2015/0098352 A1* | 4/2015 | Froehlich | H04W 24/08 370/252 |
| 2016/0100230 A1* | 4/2016 | Ma | H04N 21/44209 725/109 |
| 2017/0019865 A1* | 1/2017 | Wang | H04W 48/14 |

FOREIGN PATENT DOCUMENTS

| | | |
|---|---|---|
| CN | 102572357 A | 7/2012 |
| CN | 103702067 A | 4/2014 |
| CN | 103888846 A | 6/2014 |
| CN | 103986914 A | 8/2014 |
| CN | 104320627 A | 1/2015 |
| CN | 104519325 A | 4/2015 |
| CN | 104902575 A | 9/2015 |
| CN | 105049298 A | 11/2015 |
| EP | 3059945 A1 | 8/2016 |
| WO | 2014183540 A1 | 11/2014 |

* cited by examiner

CONTROL METHOD AND APPARATUS, AND NETWORK CONTROLLER

CROSS-REFERENCE TO RELATED APPLICATIONS

This application is a continuation of International Application No. PCT/CN2016/072025, filed on Jan. 25, 2016, the disclosure of which is hereby incorporated by reference in its entirety.

TECHNICAL FIELD

The present invention relates to the field of wireless communications technologies, and in particular, to a control method and apparatus, and a network controller.

BACKGROUND

A wireless video monitoring technology is widely applied to fields such as security monitoring, traffic management, environment monitoring, and smart household.

A video personal area network (VPAN) is a wireless network used for video monitoring. A basic service set (BSS) in the VPAN usually includes a access point (AP) and several stations (STA) that have a video monitoring function. The STA sends collected video data to the AP, and the AP forwards the video data to an upper-layer user. Wireless video monitoring is used as a main application scenario in both the VPAN standard and the Institute of Electrical and Electronics Engineers (IEEE) 802.11ah standard. In the prior art, a quality of experience (QoE) evaluation model is established on an AP side. An AP evaluates user experience quality by using the QoE evaluation model, and sends an evaluation result and a quality of service (QoS) performance evaluation parameter such as a frame discard ratio, a delay, or a jitter to the STA. When the user experience quality decreases to a threshold, the STA triggers, according to the received information, adjusting a video coding bit rate by using a corresponding control policy, so as to alleviate network congestion and improve the user experience quality.

However, in the prior art, the corresponding control policy is used only when the user experience quality has declined. Therefore, although the user experience quality can be improved in a subsequent time, the user experience quality indeed has declined for a time period. In addition, in the prior art, a specific control policy is not used for a time period in which network congestion is caused. Therefore, there is still a disadvantage in a control policy for the STA in the prior art.

SUMMARY

Embodiments of the present invention provide a control method and apparatus, and a network controller, so as to resolve a problem that exists in the prior art. The technical solutions are as follows:

According to a first aspect, a control method is provided, where the method includes: obtaining a time division scheme of a STA in a next cruise monitoring period, where the next cruise monitoring period includes N adjustment periods and N monitoring periods determined by means of division according to N preset points, and N is a positive integer; configuring control information according to the time division scheme, where the control information is for controlling an operating status of the STA in each adjustment period in the next cruise monitoring period; and sending the control information to the STA.

The time division scheme of the STA in the next cruise monitoring period is obtained, the control information is configured according to the time division scheme, and then the control information is sent to the STA. In this way, a prior-art problem that there is still a disadvantage in a control policy for a STA is resolved. In comparison with the prior art in which a corresponding control policy is used only when user experience quality has declined, in the present invention, a control policy is used before the STA enters the next cruise monitoring period, so that more effective control is implemented in time. In addition, specific control is performed on the operating status of the STA in the adjustment period, so that a specific control policy is used for a time period in which network congestion is caused, so as to improve user experience quality.

In a first possible implementation of the first aspect, the configuring control information according to the time division scheme includes any one or a combination of multiple of the following possible implementations:

1. Control information that a STA priority of the STA in the adjustment period is lower than a STA priority of the STA in the monitoring period is configured, so that the STA sends, according to a low priority, a data frame generated in the adjustment period. In the foregoing manner, it is ensured that a wanted data frame of another high-priority STA (for example, a data frame generated by another STA in a monitoring period) is sent in a timely manner, and a delay is relatively small.

2. Control information that a frame discard policy indicated by the STA to an AP in the adjustment period is a policy indicating that a data frame can be discarded is configured, so that when sending a data frame generated in the adjustment period, the STA indicates, to the AP, the policy indicating that a data frame can be discarded, and the AP selectively discards the data frame that is set to be discardable. In the foregoing manner, the AP can selectively discard the data frame generated by the STA in the adjustment period, to provide sufficient resources such as cache space and processing times for another wanted data frame.

3. Control information that an ACK policy indicated by the STA to an AP in the adjustment period is a no-ACK policy or a block ACK policy is configured, so that the STA indicates a no-ACK response or a block ACK response to the AP when sending a data frame generated in the adjustment period, and the AP makes no ACK response to the data frame for which the no-ACK response is set, or makes a block ACK response to the data frame for which the block ACK response is set. In the foregoing manner, a quantity of ACK responses in the adjustment period is reduced, so that communication resources between the AP and the STA are reduced, and network congestion is alleviated.

4. Control information that a bit rate/frame rate of the STA in the adjustment period is less than a bit rate/frame rate of the STA in the monitoring period is configured, so that the STA encodes, according to the bit rate/frame rate, monitoring information collected in the adjustment period. In the foregoing manner, a volume of data transmitted by the STA to the AP in the adjustment period is reduced, so that network congestion is alleviated.

With reference to the first possible implementation of the first aspect, in a second possible implementation of the first aspect, the control information includes a station adjustment window (English: STA Adjustment Window, SAW for short) sequence element, the SAW sequence element includes a SAW sequence control field, and the SAW sequence control field includes at least one of a STA priority field, a frame discard indicator bit field, an ACK policy field, or a bit rate/frame rate field. The STA priority field indicates the STA priority of the STA in the adjustment period. The frame discard indicator bit field indicates the frame discard policy set by the STA for the data frame generated in the adjustment period. The ACK policy field indicates the ACK policy set by the STA for the data frame generated in the adjustment period. The bit rate/frame rate field indicates a video coding bit rate/frame rate or an audio coding bit rate/frame rate used by the STA for the monitoring information collected in the adjustment period.

With reference to the first aspect, the first possible implementation of the first aspect, or the second possible implementation of the first aspect, in a third possible implementation of the first aspect, after the obtaining a time division scheme of a station STA in a next cruise monitoring period, the method further includes: scheduling, to the STA in the adjustment period, a channel access period whose allocation type is a dynamic service period (English: Dynamic Service Period, DSP for short), so that the STA sends, to the AP by using the DSP, the data frame generated in the adjustment period. A proportion of a DSP, scheduled and allocated to the STA in the adjustment period, to a service period (English: Service Period, SP for short) is greater than a proportion of a DSP, scheduled and allocated to the STA in the monitoring period, to an SP. In the foregoing manner, the DSP for the STA in the adjustment period can be occupied by another high-priority STA (for example, a STA in a monitoring period), so as to reduce a delay for sending a data frame by the STA in the monitoring period.

With reference to the first aspect, the first possible implementation of the first aspect, the second possible implementation of the first aspect, or the third possible implementation of the first aspect, in a fourth possible implementation of the first aspect, the control information includes a SAW sequence element, the SAW sequence element includes N SAW allocation fields, and each SAW allocation field includes a first one or both of a SAW start time offset field and a SAW duration field. A SAW start time offset field in an $i^{th}$ SAW allocation field indicates an offset time of a start moment of an $i^{th}$ adjustment period relative to a reference moment. A SAW duration field in the $i^{th}$ SAW allocation field indicates duration of the $i^{th}$ adjustment period.

With reference to the fourth possible implementation of the first aspect, in a fifth possible implementation of the first aspect, the sending the control information to the STA includes: when another SAW sequence element needs to be sent to another STA at an originally determined moment for sending the SAW sequence element, sending the SAW sequence element to the STA after a delay of target duration relative to the originally determined sending moment. In the foregoing manner, overlapping of adjustment periods for a plurality of STAs in a network is reduced or avoided, so that network load is reduced.

With reference to the fifth possible implementation of the first aspect, in a sixth possible implementation of the first aspect, the target duration is less than or equal to a preset threshold.

With reference to the first aspect, the first possible implementation of the first aspect, the second possible implementation of the first aspect, the third possible implementation of the first aspect, the fourth possible implementation of the first aspect, the fifth possible implementation of the first aspect, or the sixth possible implementation of the first aspect, in a seventh possible implementation of the first aspect, the obtaining a time division scheme of a STA in a next cruise monitoring period includes: receiving, from a monitoring center device, cruise track configuration information corresponding to the next cruise monitoring period, where the cruise track configuration information includes setting parameters of the N preset points; and determining the time division scheme of the STA in the next cruise monitoring period according to the setting parameters of the N preset points.

With reference to the seventh possible implementation of the first aspect, in an eighth possible implementation of the first aspect, a setting parameter of an $i^{th}$ preset point includes a monitoring setting parameter and monitoring duration of the $i^{th}$ preset point; and the determining the time division scheme of the STA in the next cruise monitoring period according to the setting parameters of the N preset points includes: determining the monitoring duration of the $i^{th}$ preset point as duration of an $i^{th}$ monitoring period for the STA in the next cruise monitoring period; and determining, according to a monitoring setting parameter of an $(i-1)^{th}$ preset point and the monitoring setting parameter of the $i^{th}$ preset point, an adjustment amount in which the STA is adjusted from the $(i-1)^{th}$ preset point to the $i^{th}$ preset point; calculating an adjustment time according to the adjustment amount and an adjustment rate; and determining the adjustment time as duration of an $i^{th}$ adjustment period for the STA in the next cruise monitoring period, where when i=1, a monitoring setting parameter of a $0^{th}$ preset point is a current monitoring setting parameter of the STA.

According to a second aspect, a control apparatus is provided, where the control apparatus includes at least one unit, and the at least one unit is configured to implement the control method provided in any one of the first aspect or the possible implementations of the first aspect.

According to a third aspect, a network controller is provided, where the network controller includes a processor, a memory, and a transceiver, the memory is configured to store one or more instructions, the instruction is configured to be executed by the processor, and the instruction is used to implement the control method provided in any one of the first aspect, or the possible implementations of the first aspect.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

Figure 1:
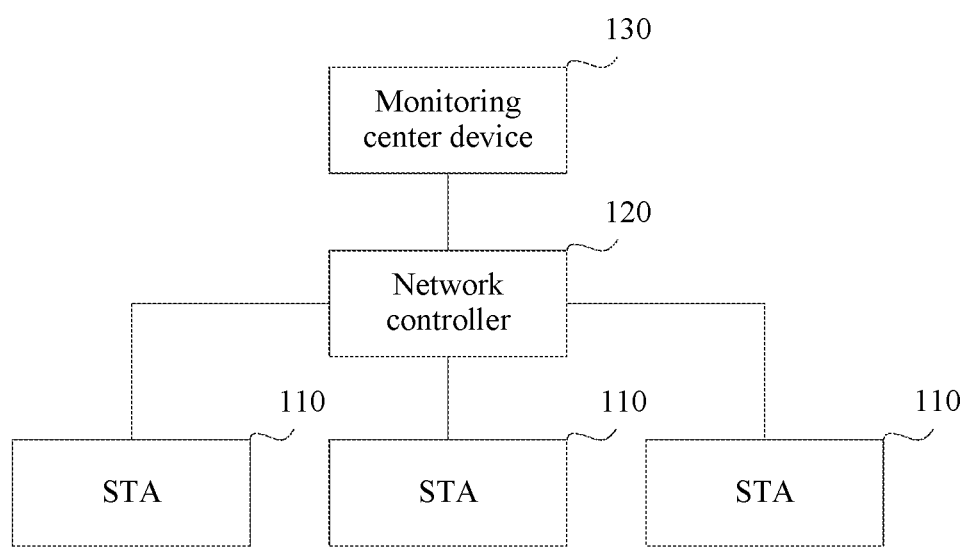
FIG. 1 is a schematic diagram of an implementation environment related to the embodiments of the present invention.

To make the objectives, technical solutions, and advantages of the present invention clearer, the following further describes the embodiments of the present invention in detail with reference to the accompanying drawings.

A "module" mentioned in this specification is a program or an instruction that is stored in a memory and that can implement some functions. A "unit" mentioned in this specification is a functional structure obtained by means of logical division. The "unit" may be implemented by hardware only or implemented by a combination of software and hardware.

A singular form "one" ("a", "an", and "the") used in this specification is intended to further include a plural form unless the context clearly supports an otherwise case. It should be further understood that "and/or" used in this specification means to include any or all possible combinations of one or more associated listed items.

In a video monitoring system, a monitoring setting parameter of a STA (such as a video monitoring terminal device) can be adjusted. In a cruise monitoring period, a user may set several preset points (or referred to as monitoring points), and set a corresponding monitoring setting parameter for each preset point. A cruise monitoring period is a time period in which the STA traverses all preset points starting from a first preset point, and then returns to the first preset point. Video monitoring is used as an example. The monitoring setting parameter usually includes a monitoring angle of a camera of the STA and a lens parameter of the camera. The monitoring angle of the camera includes a horizontal angle and a pitch angle. The lens parameter of the camera includes but is not limited to parameters such as an optical focal length, a digital focal length, and an aperture. At least one monitoring setting parameter of the camera changes when the camera is switched from a preset point to another preset point. The user sets corresponding cruise track configuration information for a cruise monitoring period for the STA. The cruise track configuration information includes setting parameters of N preset points. A setting parameter of each preset point includes the foregoing monitoring setting parameter and monitoring duration. Monitoring duration of the camera at a preset point is a time in which the camera stays at the preset point and performs monitoring. Starting from the first preset point, according to a setting parameter, the STA stays at a preset point and performs monitoring. After a monitoring time reaches monitoring duration, the STA automatically adjusts the camera according to a monitoring setting parameter of a next preset point, and performs monitoring according to monitoring duration of the next preset point. The whole process is referred to as a cruise monitoring process.

The inventor finds that, in a cruise monitoring period, the STA successively enters an adjustment period and a monitoring period in order. The adjustment period is a time range in which the STA is switched from a preset point to a next preset point. In the adjustment period, the STA adjusts a device according to a monitoring setting parameter, for example, adjusts the monitoring angle and/or the lens parameter of the camera. The adjustment period may also be referred to as a cruise adjustment phase. The monitoring period is a time range in which the STA stays at a preset point and performs monitoring. In the monitoring period, the monitoring setting parameter of the STA does not change. The monitoring period may also be referred to as a real-time monitoring phase. For example, monitoring information is encoded in a variable bit rate (English: Variable Bit Rate, VBR for short) encoding mode. In the adjustment period, because the monitoring information (for example, a video image) dynamically changes, a large volume of burst data is generated in the adjustment period. Consequently, a relatively large volume of data is generated in the adjustment period, and network load is accordingly crushed. In view of this, according to the technical solutions provided in the embodiments of the present invention, specific control is performed on an operating status of the STA in the adjustment period, so that a specific control policy is used for a time period in which network congestion is caused. The following describes and explains the technical solutions provided in the present invention by using several embodiments.

Referring to FIG. 1, FIG. 1 is a schematic diagram of an implementation environment related to the embodiments of the present invention. The implementation environment includes at least one STA 110, a network controller 120, and a monitoring center device 130.

The STA 110 is a monitoring terminal device, for example, a video monitoring terminal device in a VPAN. The STA 110 is configured to: collect monitoring information in a monitored area, and perform compression coding on the collected monitoring information to obtain a data frame. The STA 110 is further configured to send the data frame to the network controller 120 according to a channel access period scheduled and allocated by the network controller 120. The video monitoring terminal device is used as an example. The video monitoring terminal device is equipped with a camera whose monitoring setting parameter such as a monitoring angle or a lens parameter can be adjusted. The video monitoring terminal device collects image information in a monitored area by using the camera, performs compression coding on the image information to obtain a video data frame, and then sends the video data frame to the network controller 120 according to the channel access period scheduled and allocated by the network controller 120.

The network controller 120 is a network device configured to control each STA 110. The network controller 120 may be an AP, may be a personal basic service set (PBSS) controller (PCP), or may be a personal area network coordinator (PAN Coordinator). The network controller 120 is configured to send a beacon frame to the STA 110 to notify the STA 110 of allocation information of the channel access period. The network controller 120 is further configured to send a SAW sequence information frame to the STA 110 to control the STA 110 to collect the monitoring information. The network controller 120 is further configured to divide a cruise monitoring period for the STA 110 into an adjustment period and a monitoring period.

The monitoring center device 130 is user equipment deployed in a monitoring center. The monitoring center device 130 is configured to: send STA control information to the network controller 120, and receive, from the network controller 120, the data frame obtained by encoding the monitoring information.

The STA 110 establishes a communication connection to the network controller 120 by using a wireless network. For example, the wireless network may be a wireless local area network or a wireless personal area network. The network controller 120 establishes a communication connection to the monitoring center device 130 in a wired or wireless manner.

Figure 2:
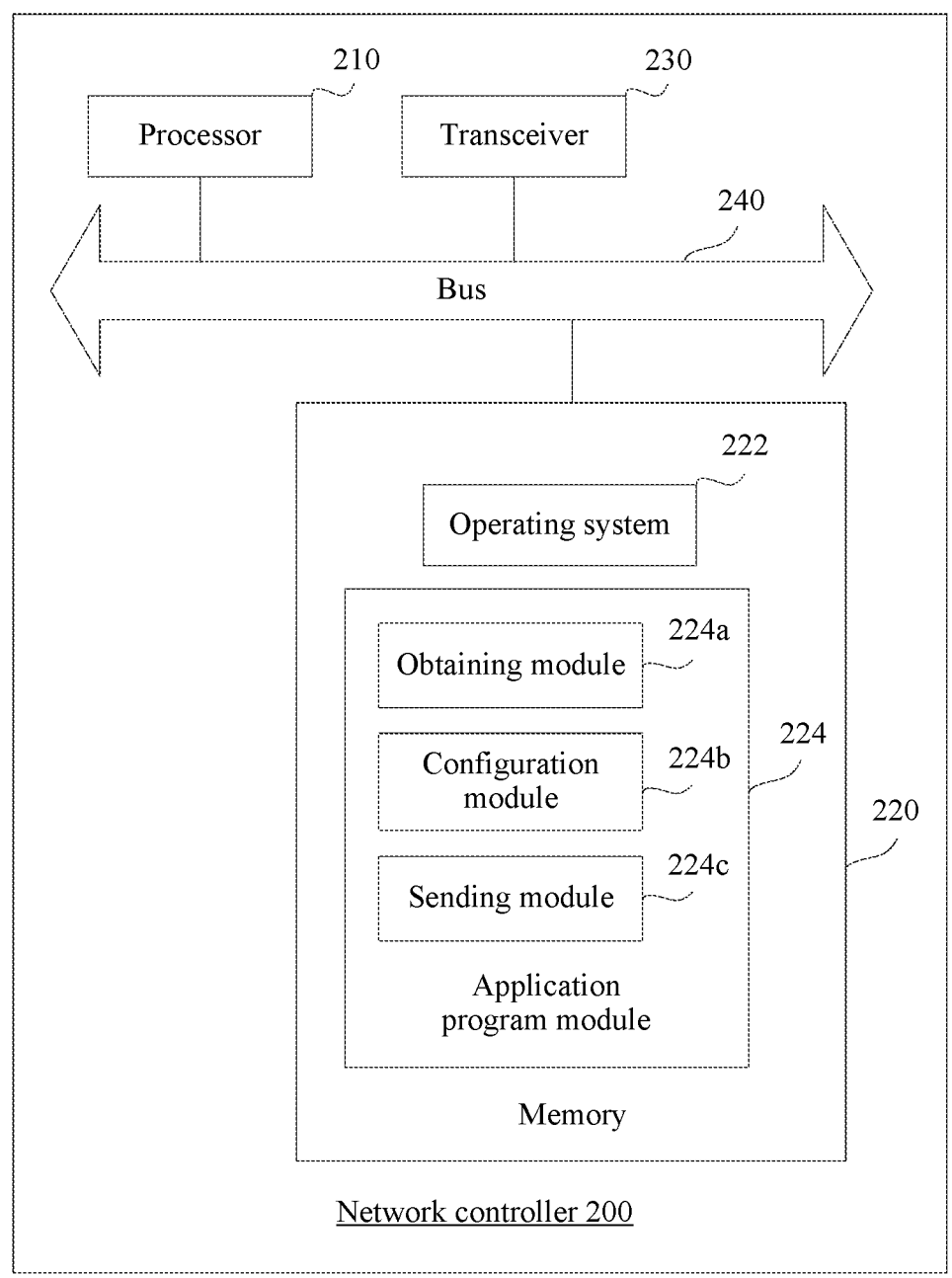
FIG. 2 is a block diagram of a network controller according to an embodiment of the present invention.

Referring to FIG. 2, FIG. 2 is a block diagram of a network controller according to an embodiment of the present invention. The network controller 200 may include a processor 210, a memory 220, a transceiver 230, and a bus 240. The memory 220 and the transceiver 230 are connected to the processor 210 by using the bus 240. For example, the network controller 200 may be an AP in a VPAN.

The processor 210 includes one or more processing cores. By running a software program and a module, the processor 210 implements various function applications and processes data. The processor 210 includes an arithmetic logic part, a register part, a control part, and the like. The processor 210 may be an independent central processing unit or an embedded processor, such as a microprocessor unit (MPU), a microcontroller unit (MCU), or a digital signal processor (Embedded Digital Signal Processor, EDSP for short).

The memory 220 may be implemented by any type of a volatile or non-volatile storage device or a combination thereof, for example, a static random access memory (SRAM), an electrically erasable programmable read-only memory (EEPROM), an erasable programmable read only memory (EPROM), a programmable read-only memory (PROM), a read-only memory (ROM), a magnetic memory, a flash memory, a magnetic disk, or an optical disc. The memory 220 may be configured to store an instruction that can be executed by a software program, a module, or the like.

The processor 210 is configured to execute the instruction stored in the memory 220. The processor 210 executes the instruction to implement the following method: obtaining a time division scheme of a STA in a next cruise monitoring period, where the next cruise monitoring period includes N adjustment periods and N monitoring periods determined by means of division according to N preset points, and N is a positive integer; configuring control information according to the time division scheme, where the control information is for controlling an operating status of the STA in each adjustment period in the next cruise monitoring period; and sending the control information to the STA.

The transceiver 230 is configured to communicate with the outside, and may include interfaces of a plurality of types. For example, the transceiver 230 is configured to: receive cruise track configuration information from a monitoring center device, send the control information to the STA, receive a data frame from the STA, forward the data frame to the monitoring center device, and so on.

In some embodiments, the memory 220 may store an operating system 222 and an application program module 224 that is required for at least one function. The operating system 222 may be an operating system such as a real-time operating system (such as Real Time eXecutive, RTX for short), Linux, UNIX, Windows, or OS X. The application program module 224 may include an obtaining module 224a, a configuration module 224b, and a sending module 224c.

The obtaining module 224a is configured to obtain the time division scheme of the STA in the next cruise monitoring period. The next cruise monitoring period includes the N adjustment periods and the N monitoring periods determined by means of division according to the N preset points, and N is a positive integer. The configuration module 224b is configured to configure the control information according to the time division scheme. The control information is for controlling the operating status of the STA in each adjustment period in the next cruise monitoring period. The sending module 224c is configured to send the control information to the STA.

In some embodiments, the network controller 200 may further include an input/output component (not shown in the figure). The input/output component includes a display configured to display information and an input device, such as a mouse or a keyboard, used by a user to enter information. Both the display and the input device are connected to the processor 210 by using the bus 240.

Figure 3:
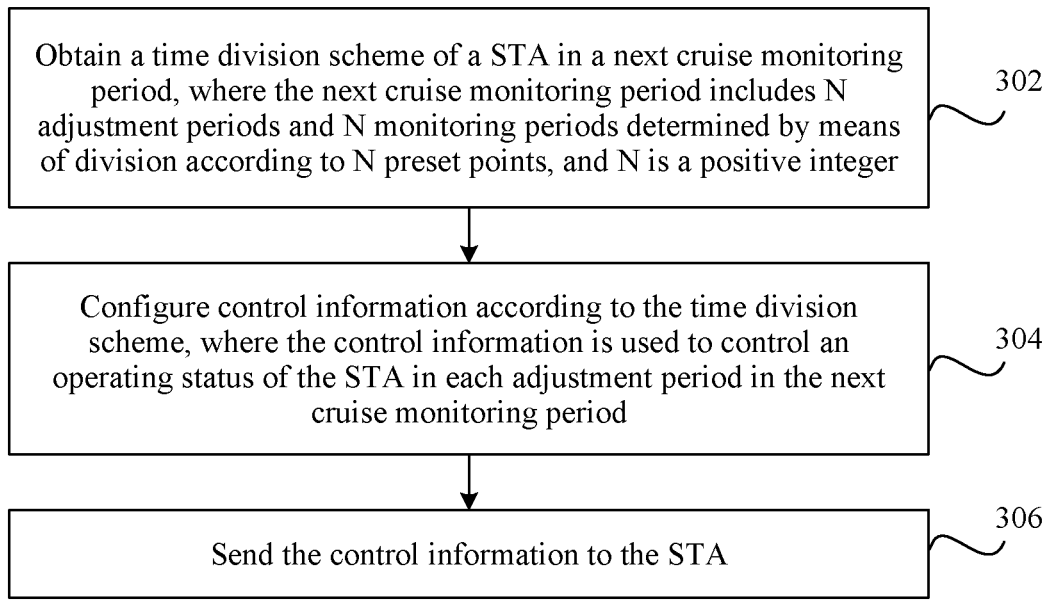
FIG. 3 is a flowchart of a control method according to an embodiment of the present invention.

Referring to FIG. 3, FIG. 3 is a flowchart of a control method according to an embodiment of the present invention. The method may be applied to the network controller 120 in the implementation environment shown in FIG. 1. The method may include the following steps:

Step 302: Obtain a time division scheme of a STA in a next cruise monitoring period, where the next cruise monitoring period includes N adjustment periods and N monitoring periods determined by means of division according to N preset points, and N is a positive integer.

Step 304: Configure control information according to the time division scheme, where the control information is for controlling an operating status of the STA in each adjustment period in the next cruise monitoring period.

Step 306: Send the control information to the STA.

In conclusion, according to the method provided in this embodiment, the time division scheme of the STA in the next cruise monitoring period is obtained, the control information is configured according to the time division scheme, and then the control information is sent to the STA. In this way, a prior-art problem that there is still a disadvantage in a control policy for a STA is resolved. In comparison with the prior art in which a corresponding control policy is used only when user experience quality has declined, in the present invention, a control policy is used before the STA enters the next cruise monitoring period, so that more effective control is implemented in time. In addition, specific control is performed on the operating status of the STA in the adjustment period, so that a specific control policy is used for a time period in which network congestion is caused, so as to improve user experience quality.

Figure 4:
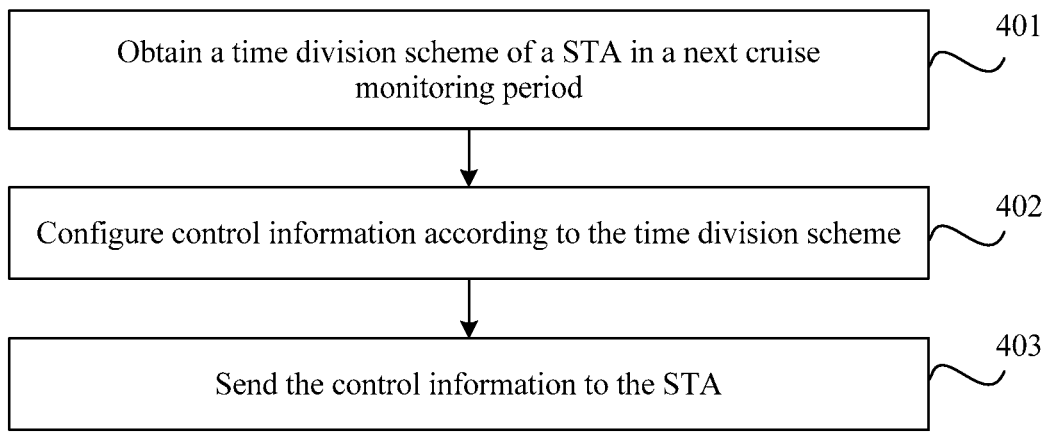
FIG. 4 is a flowchart of a control method according to another embodiment of the present invention.

Referring to FIG. 4, FIG. 4 is a flowchart of a control method according to another embodiment of the present invention. In this embodiment, an example in which steps are performed by an AP in a VPAN network is used for description. The method may include the following steps.

Step 401: Obtain a time division scheme of a STA in a next cruise monitoring period.

The AP obtains the time division scheme of the STA in the next cruise period. The next cruise monitoring period includes N adjustment periods and N monitoring periods determined by means of division according to N preset points, and N is a positive integer. The preset point is usually set by a user. In a cruise monitoring period, an adjustment period and a monitoring period are alternately arranged in order. An $i^{th}$ adjustment period is a time range in which the STA is adjusted from an $(i-1)^{th}$ preset point to an $i^{th}$ preset point, where $1 \leq i \leq N$, and i is an integer. When i=1, a $0^{th}$ preset point is a preset point currently corresponding to the STA. In an adjustment period, the STA adjusts a device according to a monitoring setting parameter, for example, adjusts a monitoring angle (such as a horizontal angle and/or a pitch angle) and/or a lens parameter (such as a focal length and/or an aperture) of a camera. An $i^{th}$ monitoring period is a time range in which the STA stays at the $i^{th}$ preset point and performs monitoring. In a monitoring period, the monitoring setting parameter of the STA does not change. After entering a cruise monitoring period, the STA first enters a first adjustment period, enters a first monitoring period after the first adjustment period ends, enters a second adjustment period after the first monitoring period ends, enters a second monitoring period after the second adjustment period ends, and so on.

Specifically, the AP receives, from a monitoring center device, cruise track configuration information corresponding to the next cruise monitoring period. The cruise track configuration information includes setting parameters of the N preset points. The AP determines the time division scheme of the STA in the next cruise monitoring period according to the setting parameters of the N preset points.

In a possible implementation, a setting parameter of the $i^{th}$ preset point includes a monitoring setting parameter and monitoring duration of the $i^{th}$ preset point. The AP determines the monitoring duration of the $i^{th}$ preset point as duration of the $i^{th}$ monitoring period for the STA in the next cruise monitoring period. The AP determines, according to a monitoring setting parameter of the $(i-1)^{th}$ preset point and the monitoring setting parameter of the $i^{th}$ preset point, an adjustment amount in which the STA is adjusted from the $(i-1)^{th}$ preset point to the $i^{th}$ preset point; calculates an adjustment time according to the adjustment amount and an adjustment rate; and determines the calculated adjustment time as duration of the $i^{th}$ adjustment period for the STA in the next cruise monitoring period. When i=1, a monitoring setting parameter of the $0^{th}$ preset point is a current monitoring setting parameter of the STA.

When only one monitoring setting parameter in the monitoring setting parameter of the $i^{th}$ preset point changes in comparison with the monitoring setting parameter of the $(i-1)^{th}$ preset point, the AP calculates an adjustment time according to an adjustment rate and an adjustment amount corresponding to the monitoring setting parameter, and uses the calculated adjustment time as duration of the $i^{th}$ adjustment period for the STA in the next cruise monitoring period. When a plurality of monitoring setting parameters in the monitoring setting parameter of the $i^{th}$ preset point change in comparison with the monitoring setting parameter of the $(i-1)^{th}$ preset point, the AP separately calculates an adjustment time according to an adjustment rate and an adjustment amount corresponding to each monitoring setting parameter, and selects an adjustment time with a maximum value from all adjustment times as duration of the $i^{th}$ adjustment period for the STA in the next cruise monitoring period. For example, when the STA is adjusted from a preset point to a next preset point, both a monitoring angle and a lens focal length change. An adjustment time corresponding to the monitoring angle is 1 second, and an adjustment time corresponding to the lens focal length is 1.1 seconds. In this case, duration of an adjustment period is 1.1 seconds.

In addition, the adjustment rate may be set by the user by using the monitoring center device. The AP obtains the adjustment rate set by the user. Alternatively, the AP may obtain the adjustment rate by performing calculation according to a historical adjustment time and a historical adjustment amount of the STA. For example, when an adjustment period ends, the STA sends an end time stamp to the AP. The AP calculates an adjustment time according to a start time stamp and the end time stamp of the adjustment period, so as to obtain an adjustment rate by performing calculation according to a known adjustment amount and the adjustment time.

In another possible implementation, the time division scheme of the STA in the next cruise monitoring period is determined by the monitoring center device according to the setting parameters of the N preset points. A calculation manner is similar to the foregoing calculation manner used by the AP to determine the time division scheme according to the setting parameters of the N preset points. Details are not described herein again. Then, the monitoring center device sends the time division scheme of the STA in the next cruise monitoring period to the AP. Correspondingly, the AP receives the time division scheme of the STA in the next cruise monitoring period from the monitoring center device.

In the implementation described above, the duration of the adjustment period is obtained by performing calculation by the AP or the monitoring center device according to the adjustment amount and the adjustment rate. In another possible implementation, alternatively, the duration of the adjustment period may be set by the user. The cruise track configuration information obtained by the monitoring center device includes duration that is set by the user and that is of each adjustment period for the STA in the next cruise monitoring period.

Step 402: Configure control information according to the time division scheme.

The AP configures the control information according to the time division scheme. The control information is for controlling an operating status of the STA in each adjustment period in the next cruise monitoring period.

This step includes one or more of the following possible implementations.

1. The AP configures control information that a STA priority of the STA in the adjustment period is lower than a STA priority of the STA in the monitoring period, so that the STA sends, according to a low priority, a data frame generated in the adjustment period.

A STA priority is for controlling a priority of sending a data frame by the STA to the AP. Because the data frame generated by the STA in the adjustment period is of relatively slight significance to the user, the STA sends, according to the low priority, the data frame generated in the adjustment period, and sends, according to a high priority, a data frame generated in the monitoring period, so as to ensure that a wanted data frame of another high-priority STA (for example, a data frame generated by another STA in a monitoring period) is sent in a timely manner, and a delay is relatively small. In some embodiments, the STA sends, according to a low priority, a common-type data frame generated in the adjustment period. The STA still sends, according to a priority (for example, the priority of the STA in the monitoring period) specified in a protocol, a high-priority data frame obtained in the adjustment period. The high-priority data frame includes but is not limited to a data frame that includes a monitored target and a relay data frame that is from another STA. In the foregoing manner, it is ensured that the high-priority data frame obtained by the STA in the adjustment period is sent in a timely manner, and a delay is relatively small.

2. The AP configures control information that a frame discard policy indicated by the STA to the AP in the adjustment period is a policy indicating that a data frame can be discarded, so that when sending a data frame generated in the adjustment period, the STA indicates, to the AP, the policy indicating that a data frame can be discarded, and the AP selectively discards the data frame that is set to be discardable.

In the foregoing manner, the AP can selectively discard the data frame generated by the STA in the adjustment period, to provide sufficient resources such as cache space and processing times for another wanted data frame. In some embodiments, for a common-type data frame generated in the adjustment period, when sending the common-type data frame, the STA notifies the AP that the common-type data frame can be discarded. The AP selectively discards the common-type data frame that is set to be discardable. For a high-priority data frame obtained in the adjustment period, when sending the high-priority data frame, the STA notifies the AP that the high-priority data frame cannot be discarded. In the foregoing manner, it is ensured that the high-priority data frame obtained by the STA in the adjustment period can be effectively received by the AP.

3. The AP configures control information that an ACK policy indicated by the STA to the AP in the adjustment period is a no-ACK policy or a block ACK policy, so that the STA indicates a no-ACK response or a block ACK response to the AP when sending a data frame generated in the adjustment period, and the AP makes no ACK response to the data frame for which the no-ACK response is set, or makes a block ACK response to the data frame for which the block ACK response is set.

The block ACK response is an ACK response that is fed back by a receive end to a transmit end after the receive end receives a plurality of data frames from the transmit end and that indicates a receiving status of the plurality of data frames. In the foregoing manner, a quantity of ACK responses in the adjustment period is reduced, so that communication resources between the AP and the STA are reduced, and network congestion is alleviated. In some embodiments, for a common-type data frame generated in the adjustment period, the STA indicates a no-ACK response or a block ACK response to the AP when sending the common-type data frame. For a high-priority data frame obtained in the adjustment period, the STA indicates an immediate-ACK response to the AP when sending the high-priority data frame, so that the STA immediately feeds back an ACK response to the data frame for which the immediate-ACK response is set. In the foregoing manner, it is ensured that the high-priority data frame obtained by the STA in the adjustment period can be reliably and effectively received by the AP.

4. The AP configures control information that a bit rate/frame rate of the STA in the adjustment period is less than a bit rate/frame rate of the STA in the monitoring period, so that the STA encodes, according to the bit rate/frame rate, monitoring information collected in the adjustment period.

When the STA uses a VBR encoding mode, the AP configures control information that a frame rate of the STA in the adjustment period is less than a frame rate of the STA in the monitoring period, so that the STA encodes, according to the frame rate, the monitoring information collected in the adjustment period. When the STA uses a constant bit rate (English: Constant Bit Rate, CBR for short) encoding mode, the AP configures control information that a bit rate of the STA in the adjustment period is less than a bit rate of the STA in the monitoring period, so that the STA encodes, according to the bit rate, the monitoring information collected in the adjustment period. In the foregoing manner, a volume of data transmitted by the STA to the AP in the adjustment period is reduced, so that network congestion is alleviated.

In this embodiment, an example in which the control information is a SAW sequence information frame is used. The control information includes a SAW sequence element. The SAW sequence element includes a SAW sequence control field. The SAW sequence control field includes at least one of a STA priority field, a frame discard indicator bit field, an ACK policy field, or a bit rate/frame rate field.

The STA priority field indicates the STA priority of the STA in the adjustment period. Usually, for a STA, control information that a STA priority of the STA in an adjustment period is lower than a STA priority of the STA in a monitoring period is configured.

The frame discard indicator bit field indicates the frame discard policy set by the STA for the data frame generated in the adjustment period. For example, when the frame discard indicator bit field is set to 1, it indicates that the frame discard policy set by the STA for the data frame generated in the adjustment period is a policy indicating that a data frame can be discarded. When the frame discard indicator bit field is set to 0, it indicates that the frame discard policy set by the STA for the data frame generated in the adjustment period is a policy indicating that a data frame cannot be discarded.

The ACK policy field indicates the ACK policy set by the STA for the data frame generated in the adjustment period. For example, when the ACK policy field is set to 1, it indicates that the ACK policy set by the STA for the data frame generated in the adjustment period is a no-ACK policy. When the ACK policy field is set to 2, it indicates that the ACK policy set by the STA for the data frame generated in the adjustment period is an immediate-ACK policy. When the ACK policy field is set to 3, it indicates that the ACK policy set by the STA for the data frame generated in the adjustment period is a block ACK policy. When the ACK policy field is set to 0, it indicates that when sending, to the AP, the data frame generated in the adjustment period, the STA autonomously determines to use a specific ACK policy, that is, the STA autonomously determines to use any one of the no-ACK policy, the immediate-ACK policy, or the block ACK policy.

The bit rate/frame rate field indicates a video coding bit rate/frame rate or an audio coding bit rate/frame rate used by the STA for the monitoring information collected in the adjustment period. In some embodiments, the bit rate/frame rate field indicates a decreased multiple of a video coding bit rate/frame rate or an audio coding bit rate/frame rate used by the STA for the monitoring information collected in the adjustment period relative to that used by the STA for monitoring information collected in the monitoring period. For example, when the bit rate/frame rate field is separately set to 0 to 3, it indicates that the video coding bit rate/frame rate or the audio coding bit rate/frame rate used by the STA for the monitoring information collected in the adjustment period relative to that used by the STA for the monitoring information collected in the monitoring period does not change, decreases to ½, decreases to ¼, and decreases to ⅛. When a decreased bit rate/frame rate is not an integer, the decreased bit rate/frame rate should be rounded up to a nearest integer. In addition, when the STA uses the VBR encoding mode, the bit rate/frame rate field specifically indicates the frame rate. When the STA uses the CBR encoding mode, the bit rate/frame rate field specifically indicates the bit rate.

Referring to Table-1, Table-1 shows a format of the SAW sequence element. The SAW sequence element includes an element ID field, a length field, and a SAW sequence control field. An element ID indicates an ID of the SAW sequence element, and is an identifier of the SAW sequence element. The length field indicates a data length of the SAW sequence element.

TABLE 1

| Element ID | Length | SAW sequence control | SAW allocation | SAW allocation | ... | SAW allocation |
|---|---|---|---|---|---|---|

Referring to Table-2, Table-2 shows a format of the SAW sequence control field. The SAW sequence control field includes a STA association ID field, an ended SAW sequence element ID field, an established SAW sequence element ID field, a STA priority field, a frame discard indicator bit field, an ACK policy field, a bit rate/frame rate field, and a reserved field.

TABLE 2

| STA association ID | Ended SAW sequence element ID | Established SAW sequence element ID | STA priority | Frame discard indicator bit | ACK policy | Bit rate/ Frame rate | Duration type | Reserved |
|---|---|---|---|---|---|---|---|---|

The STA association ID field indicates a specified association ID of a STA. The association ID of the STA is used to uniquely identify the STA, and is an identifier of the STA. The ended SAW sequence element ID is used to instruct the STA to end a cruise monitoring period corresponding to a SAW sequence element identified by the element ID. The established SAW sequence element ID is used to instruct the STA to enter a cruise monitoring period corresponding to a SAW sequence element identified by the element ID.

In some embodiments, as shown in Table-1, the SAW sequence element further includes N SAW allocation fields. Each SAW allocation field is corresponding to an adjustment period. Each SAW allocation field includes a first one or both of a SAW start time offset field and a SAW duration field. A SAW start time offset field in an $i^{th}$ SAW allocation field indicates an offset time of a start moment of an $i^{th}$ adjustment period relative to a reference moment. Usually, the reference moment is a moment at which the STA receives the SAW sequence element sent by the AP. A SAW duration field in the $i^{th}$ SAW allocation field indicates duration of the $i^{th}$ adjustment period.

Correspondingly, as shown in Table-2, the SAW sequence control field further includes a duration type field. The duration type field indicates a type of the duration field of the SAW allocation field in the SAW sequence element. For example, when the duration type field is set to 0, it indicates that the duration field of the SAW allocation field exists. When the duration type field is set to 1, it indicates that the duration field of the SAW allocation field does not exist. For example, when the AP cannot determine duration of each adjustment period for the STA in the next cruise monitoring period, the duration type field is set to 1. In this case, the SAW sequence element sent by the AP does not explicitly indicate duration in which the STA is in the adjustment period, but the STA indicates, according to an indication of a rotating apparatus or a focal length adjustment apparatus of the camera of the STA, whether the STA is in the adjustment period.

Step 403: Send the control information to the STA.

The AP sends the control information to the STA. In this embodiment, the control information includes a SAW sequence element. The SAW sequence element may be included in various types of management frames or control frames sent by the AP to the STA, for example, a beacon frame, an announcement frame, or a command frame. After receiving the SAW sequence element sent by the AP, the STA immediately ends a cruise monitoring period corresponding to an ended SAW sequence element ID field in the SAW sequence element, enters a cruise monitoring period corresponding to an established SAW sequence element ID field in the SAW sequence element, successively enters each adjustment period and each monitoring period according to a SAW allocation field, and controls an operating status of the STA in each adjustment period according to a SAW sequence control field.

Because the VPAN may include a plurality of STAs, to avoid excessively heavy network load caused when the plurality of STAs are simultaneously in adjustment periods, when another SAW sequence element needs to be sent to another STA at an originally determined moment for sending the SAW sequence element, the AP sends the SAW sequence element to the STA after a delay of target duration relative to the originally determined sending moment. The originally determined moment for sending the SAW sequence element is a moment at which the AP generates, according to the cruise track configuration information corresponding to the STA in the next cruise monitoring period, the SAW sequence element after receiving the cruise track configuration information from the monitoring center device. In some embodiments, the target duration for the delay may be limited to a preset threshold, and the target duration is less than or equal to the preset threshold. Usually, the preset threshold is set by the user in a customized manner. For example, the preset threshold is 1 second. Certainly, in another possible implementation, the preset threshold may be automatically set by the AP. The preset threshold indicates maximum sending delay duration for the AP relative to the originally determined moment for sending the SAW sequence element. In some embodiments, the AP may adjust an offset time and/or the duration of the adjustment period for the STA, so as to avoid overlapping of adjustment periods for the plurality of STAs in the network. Usually, the user concerns and sets only duration of each monitoring period for the STA, and does not concern a start moment of each monitoring period and a start moment and duration of each adjustment period for the STA. Therefore, the AP may send the SAW sequence element after a proper delay of a short time period within an adjustment range specified by the preset threshold, so as to reduce or avoid the overlapping of the adjustment periods for the plurality of STAs in the network, so that the network load is reduced.

It should also be noted that, after obtaining the time division scheme of the STA in the next cruise monitoring period, the AP may further perform the following step: The AP schedules, to the STA in the adjustment period, a channel access period whose allocation type is a DSP, so that the STA sends, to the AP by using the DSP, the data frame generated in the adjustment period. A proportion of a DSP, scheduled and allocated to the STA in the adjustment period, to an SP is greater than a proportion of a DSP, scheduled and allocated to the STA in the monitoring period, to an SP. In some embodiments, the STA sends, by using the channel access period whose type is a DSP, a common-type data frame generated in the adjustment period. The STA still sends, by using a channel access period whose type is an SP, a high-priority data frame obtained in the adjustment period. Because the channel access period whose type is a DSP may be occupied by another STA, in the foregoing manner, the DSP for the STA in the adjustment period can be occupied by another high-priority STA (for example, a STA in a monitoring period), so as to reduce a delay for sending a data frame by the STA in the monitoring period.

In some embodiments, when the AP instructs the STA to decrease the bit rate/frame rate in the adjustment period, the AP may further adaptively reduce, according to a decreased bit rate/frame rate amount, a channel access time scheduled and allocated to the STA in the adjustment period, so as to schedule and allocate a more channel access time to the STA in the monitoring period, and accordingly reduce a delay for sending a data frame by the STA in the monitoring period.

In some embodiments, the control information includes a beacon frame. The AP indicates allocation information of the channel access period to the AP by sending the beacon frame to the STA. The beacon frame includes a first field and/or a second field. The first field indicates the type of the channel access period scheduled and allocated by the AP to the STA in the adjustment period. The second field indicates the channel access time scheduled and allocated by the AP to the STA in the adjustment period.

In conclusion, according to the method provided in this embodiment, the time division scheme of the STA in the next cruise monitoring period is obtained, the control information is configured according to the time division scheme, and then the control information is sent to the STA. In this way, a prior-art problem that there is still a disadvantage in a control policy for a STA is resolved. In comparison with the prior art in which a corresponding control policy is used only when user experience quality has declined, in the present invention, a control policy is used before the STA enters the next cruise monitoring period, so that more effective control is implemented in time. In addition, specific control is performed on the operating status of the STA in the adjustment period, so that a specific control policy is used for a time period in which network congestion is caused, so as to improve user experience quality.

In addition, the control information that the STA priority of the STA in the adjustment period is lower than the STA priority of the STA in the monitoring period is configured, so as to ensure that the wanted data frame of the another high-priority STA (for example, the data frame generated by the another STA in the monitoring period) is sent in a timely manner, and the delay is relatively small. The control information that the frame discard policy indicated by the STA to the AP in the adjustment period is the policy indicating that a data frame can be discarded is configured, so that the AP can selectively discard the data frame generated by the STA in the adjustment period, to provide sufficient resources such as cache space and processing times for another wanted data frame. The control information that the ACK policy indicated by the STA to the AP in the adjustment period is the no-ACK policy or the block ACK policy is configured, so as to reduce a quantity of ACK responses in the adjustment period, so that communication resources between the AP and the STA are reduced, and network congestion is alleviated. The control information that the bit rate/frame rate of the STA in the adjustment period is less than the bit rate/frame rate of the STA in the monitoring period is configured, so as to reduce a volume of data transmitted by the STA to the AP in the adjustment period, so that the network congestion is alleviated.

In addition, when the another SAW sequence element needs to be sent to the another STA at the originally determined moment for sending the SAW sequence element, the SAW sequence element is sent to the STA after the delay of the target duration relative to the originally determined sending moment, so as to reduce or avoid the overlapping of the adjustment periods for the plurality of STAs in the network, so that the network load is reduced.

In addition, the channel access period whose allocation type is a DSP is scheduled to the STA in the adjustment period, so that the DSP for the STA in the adjustment period can be occupied by the another high-priority STA (for example, the STA in the monitoring period), so as to reduce the delay for sending a data frame by the STA in the monitoring period.

In addition, in the foregoing embodiments, an example in which the technical solutions provided in the present invention are applied to a video monitoring scenario is merely used for description. The technical solutions provided in the present invention are also applicable to another wireless real-time monitoring scenario. For example, according to an actual monitoring requirement, the monitoring information may include any one or a combination of multiple of video data, high-fidelity audio data, or a high-definition captured image. According to the technical solutions provided in the present invention, a study direction is pointed out for problems such as strong data flow burst and relatively low real-time quality caused when dynamic monitoring and monitoring scenario change and adjustment are implemented in a wireless real-time monitoring field.

The following is an apparatus embodiment of the present invention, and the apparatus embodiment may be used to execute the method embodiment of the present invention. For details not disclosed in the apparatus embodiment of the present invention, refer to the method embodiment of the present invention.

Figure 5:
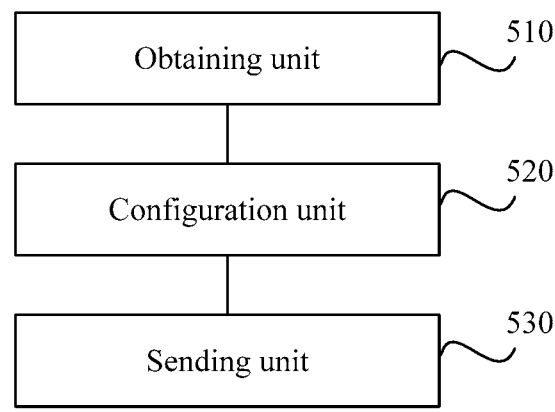
FIG. 5 is a block diagram of a control apparatus according to an embodiment of the present invention.

Referring to FIG. 5, FIG. 5 is a block diagram of a control apparatus according to an embodiment of the present invention. The control apparatus may be implemented as a part or all of a network controller by using software, hardware, or a combination of software and hardware. The control apparatus may include an obtaining unit 510, a configuration unit 520, and a sending unit 530.

The obtaining unit 510 is configured to obtain a time division scheme of a station STA in a next cruise monitoring period. The next cruise monitoring period includes N adjustment periods and N monitoring periods determined by means of division according to N preset points, and N is a positive integer.

The configuration unit 520 is configured to configure control information according to the time division scheme obtained by the obtaining unit 510. The control information is for controlling an operating status of the STA in each adjustment period in the next cruise monitoring period.

The sending unit 530 is configured to send, to the STA, the control information configured by the configuration unit 520.

In conclusion, according to the apparatus provided in this embodiment, the time division scheme of the STA in the next cruise monitoring period is obtained, the control information is configured according to the time division scheme, and then the control information is sent to the STA. In this way, a prior-art problem that there is still a disadvantage in a control policy for a STA is resolved. In comparison with the prior art in which a corresponding control policy is used only when user experience quality has declined, in the present invention, a control policy is used before the STA enters the next cruise monitoring period, so that more effective control is implemented in time. In addition, specific control is performed on the operating status of the STA in the adjustment period, so that a specific control policy is used for a time period in which network congestion is caused, so as to improve user experience quality.

Figure 6:
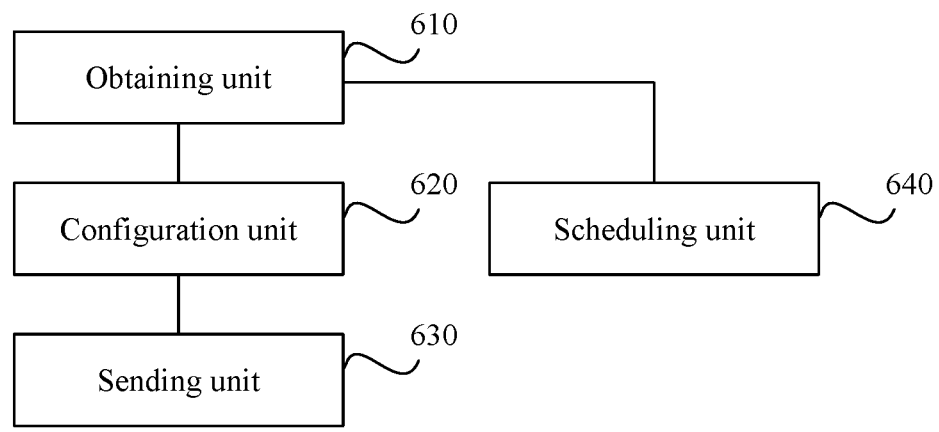
FIG. 6 is a block diagram of a control apparatus according to another embodiment of the present invention.

Referring to FIG. 6, FIG. 6 is a block diagram of a control apparatus according to another embodiment of the present invention. The control apparatus may be implemented as a part or all of a network controller by using software, hardware, or a combination of software and hardware. The control apparatus may include an obtaining unit 610, a configuration unit 620, and a sending unit 630.

The obtaining unit 610 is configured to obtain a time division scheme of a station STA in a next cruise monitoring period. The next cruise monitoring period includes N adjustment periods and N monitoring periods determined by means of division according to N preset points, and N is a positive integer.

The configuration unit 620 is configured to configure control information according to the time division scheme obtained by the obtaining unit 610. The control information is for controlling an operating status of the STA in each adjustment period in the next cruise monitoring period.

The sending unit 630 is configured to send, to the STA, the control information configured by the configuration unit 620.

In some embodiments, the configuration unit 620 is specifically configured to:

configure control information that a STA priority of the STA in the adjustment period is lower than a STA priority of the STA in the monitoring period, so that the STA sends, according to a low priority, a data frame generated in the adjustment period; and/or configure control information that a frame discard policy indicated by the STA to an AP in the adjustment period is a policy indicating that a data frame can be discarded, so that when sending a data frame generated in the adjustment period, the STA indicates, to the AP, the policy indicating that a data frame can be discarded, and the AP selectively discards the data frame that is set to be discardable; and/or configure control information that an ACK policy indicated by the STA to an AP in the adjustment period is a no-ACK policy or a block ACK policy, so that the STA indicates a no-ACK response or a block ACK response to the AP when sending a data frame generated in the adjustment period, and the AP makes no ACK response to the data frame for which the no-ACK response is set, or makes a block ACK response to the data frame for which the block ACK response is set; and/or configure control information that a bit rate/frame rate of the STA in the adjustment period is less than a bit rate/frame rate of the STA in the monitoring period, so that the STA encodes, according to the bit rate/frame rate, monitoring information collected in the adjustment period.

In some embodiments, the control information includes a SAW sequence element, the SAW sequence element includes a SAW sequence control field, and the SAW sequence control field includes at least one of a STA priority field, a frame discard indicator bit field, an ACK policy field, or a bit rate/frame rate field. The STA priority field indicates the STA priority of the STA in the adjustment period. The frame discard indicator bit field indicates the frame discard policy set by the STA for the data frame generated in the adjustment period. The ACK policy field indicates the ACK policy set by the STA for the data frame generated in the adjustment period. The bit rate/frame rate field indicates a video coding bit rate/frame rate or an audio coding bit rate/frame rate used by the STA for the monitoring information collected in the adjustment period.

In some embodiments, the control apparatus may further include a scheduling unit 640. The scheduling unit 640 is configured to schedule, to the STA in the adjustment period, a channel access period whose allocation type is a DSP, so that the STA sends, to the AP by using the DSP, the data frame generated in the adjustment period. A proportion of a DSP, scheduled and allocated to the STA in the adjustment period, to an SP is greater than a proportion of a DSP, scheduled and allocated to the STA in the monitoring period, to an SP.

In some embodiments, the control information includes a SAW sequence element, the SAW sequence element includes N SAW allocation fields, and each SAW allocation field includes a first one or both of a SAW start time offset field and a SAW duration field. A SAW start time offset field in an $i^{th}$ SAW allocation field indicates an offset time of a start moment of an $i^{th}$ adjustment period relative to a reference moment. A SAW duration field in the $i^{th}$ SAW allocation field indicates duration of the $i^{th}$ adjustment period.

In some embodiments, the sending unit 630 is specifically configured to: when another SAW sequence element needs to be sent to another STA at an originally determined moment for sending the SAW sequence element, send the SAW sequence element to the STA after a delay of target duration relative to the originally determined sending moment. Optionally, the target duration is less than or equal to a preset threshold.

In some embodiments, the obtaining unit 610 is specifically configured to: receive, from a monitoring center device, cruise track configuration information corresponding to the next cruise monitoring period, where the cruise track configuration information includes setting parameters of the N preset points; and determine the time division scheme of the STA in the next cruise monitoring period according to the setting parameters of the N preset points.

In some embodiments, a setting parameter of an $i^{th}$ preset point includes a monitoring setting parameter and monitoring duration of the $i^{th}$ preset point. Correspondingly, the obtaining unit 610 is specifically configured to: determine the monitoring duration of the $i^{th}$ preset point as duration of an $i^{th}$ monitoring period for the STA in the next cruise monitoring period; determine, according to a monitoring setting parameter of an $(i-1)^{th}$ preset point and the monitoring setting parameter of the $i^{th}$ preset point, an adjustment amount in which the STA is adjusted from the $(i-1)^{th}$ preset point to the $i^{th}$ preset point; calculate an adjustment time according to the adjustment amount and an adjustment rate; and determine the adjustment time as duration of an $i^{th}$ adjustment period for the STA in the next cruise monitoring period. When i=1, a monitoring setting parameter of a $0^{th}$ preset point is a current monitoring setting parameter of the STA.

In conclusion, according to the apparatus provided in this embodiment, the time division scheme of the STA in the next cruise monitoring period is obtained, the control information is configured according to the time division scheme, and then the control information is sent to the STA. In this way, a prior-art problem that there is still a disadvantage in a control policy for a STA is resolved. In comparison with the prior art in which a corresponding control policy is used only when user experience quality has declined, in the present invention, a control policy is used before the STA enters the next cruise monitoring period, so that more effective control is implemented in time. In addition, specific control is performed on the operating status of the STA in the adjustment period, so that a specific control policy is used for a time period in which network congestion is caused, so as to improve user experience quality.

In addition, the control information that the STA priority of the STA in the adjustment period is lower than the STA priority of the STA in the monitoring period is configured, so as to ensure that a wanted data frame of another high-priority STA (for example, a data frame generated by another STA in a monitoring period) is sent in a timely manner, and a delay is relatively small. The control information that the frame discard policy indicated by the STA to the AP in the adjustment period is the policy indicating that a data frame can be discarded is configured, so that the AP can selectively discard the data frame generated by the STA in the adjustment period, to provide sufficient resources such as cache space and processing times for another wanted data frame. The control information that the ACK policy indicated by the STA to the AP in the adjustment period is the no-ACK policy or the block ACK policy is configured, so as to reduce a quantity of ACK responses in the adjustment period, so that communication resources between the AP and the STA are reduced, and network congestion is alleviated. The control information that the bit rate/frame rate of the STA in the adjustment period is less than the bit rate/frame rate of the STA in the monitoring period is configured, so as to reduce a volume of data transmitted by the STA to the AP in the adjustment period, so that the network congestion is alleviated.

In addition, when the another SAW sequence element needs to be sent to the another STA at the originally determined moment for sending the SAW sequence element, the SAW sequence element is sent to the STA after the delay of the target duration relative to the originally determined sending moment, so as to reduce or avoid overlapping of adjustment periods for a plurality of STAs in a network, so that network load is reduced.

In addition, the channel access period whose allocation type is a DSP is scheduled to the STA in the adjustment period, so that the DSP for the STA in the adjustment period can be occupied by another high-priority STA (for example, a STA in a monitoring period), so as to reduce a delay for sending a data frame by the STA in the monitoring period.

It should be noted that, when the apparatus provided in the foregoing embodiments implements the functions of the apparatus, division of the foregoing function modules is merely used as an example for description. In practical application, the foregoing functions may be allocated to different function modules for implementation according to a requirement, that is, an internal structure of a device is divided into different function modules, so as to implement all or some of the functions described above. In addition, the apparatus provided in the embodiments pertains to a same concept as the method embodiments. For a specific implementation process, refer to the method embodiments. Details are not described herein again.

A person of ordinary skill in the art may understand that all or some of the steps of the embodiments may be implemented by hardware or a program instructing related hardware. The program may be stored in a computer-readable storage medium. The storage medium may include: a read-only memory, a magnetic disk, or an optical disc.

The foregoing descriptions are merely example embodiments of the present invention, but are not intended to limit the present invention. Any modification, equivalent replacement, and improvement made without departing from the spirit and principle of the present invention shall fall within the protection scope of the present invention.

What is claimed is:

1. A control method, wherein the method comprises:
    obtaining a time division scheme of a station (STA) in a next cruise monitoring period, wherein the next cruise monitoring period comprises N adjustment periods and N monitoring periods determined by division according to N preset points, and N is a positive integer;
    configuring control information according to the time division scheme, wherein the control information is for controlling an operating status of the STA in each adjustment period in the next cruise monitoring period; and
    sending the control information to the STA.

2. The method according to claim 1, wherein configuring the control information according to the time division scheme comprises:
    configuring control information that a STA priority of the STA in the adjustment period is lower than a STA priority of the STA in the monitoring period, so that the STA sends, according to a low priority, a data frame generated in the adjustment period; and/or
    configuring control information that a frame discard policy indicated by the STA to an access point (AP) in the adjustment period is a policy indicating that a data frame can be discarded, so that when sending a data frame generated in the adjustment period, the STA indicates, to the AP, the policy indicating that a data frame can be discarded, and the AP selectively discards the data frame that is set to be discardable; and/or
    configuring control information that an ACK policy indicated by the STA to an AP in the adjustment period is a no-ACK policy or a block ACK policy, so that the STA indicates a no-ACK response or a block ACK response to the AP when sending a data frame generated in the adjustment period, and the AP makes no ACK response to the data frame for which the no-ACK response is set, or makes a block ACK response to the data frame for which the block ACK response is set; and/or
    configuring control information that a bit rate/frame rate of the STA in the adjustment period is less than a bit rate/frame rate of the STA in the monitoring period, so that the STA encodes, according to the bit rate/frame rate, monitoring information collected in the adjustment period.

3. The method according to claim 2, wherein the control information comprises a station adjustment window SAW sequence element, the SAW sequence element comprising a SAW sequence control field, the SAW sequence control field comprising at least one of a STA priority field, a frame discard indicator bit field, an ACK policy field, or a bit rate/frame rate field, wherein
    the STA priority field indicates the STA priority of the STA in the adjustment period;
    the frame discard indicator bit field indicates the frame discard policy set by the STA for the data frame generated in the adjustment period;
    the ACK policy field indicates the ACK policy set by the STA for the data frame generated in the adjustment period; and
    the bit rate/frame rate field indicates a video coding bit rate/frame rate or an audio coding bit rate/frame rate used by the STA for the monitoring information collected in the adjustment period.

4. The method according to claim 1, after obtaining a time division scheme of a station STA in a next cruise monitoring period, further comprising:
    scheduling, to the STA in the adjustment period, a channel access period whose allocation type is a dynamic service period DSP, so that the STA sends, to an access point (AP) by using the DSP, a data frame generated in the adjustment period, wherein
    a proportion of a DSP, scheduled and allocated to the STA in the adjustment period, to an SP is greater than a proportion of a DSP, scheduled and allocated to the STA in the monitoring period, to an SP.

5. The method according to claim 1, wherein the control information comprises a station adjustment window SAW sequence element, the SAW sequence element comprises N SAW allocation fields, and each SAW allocation field comprises a first one or both of a SAW start time offset field and a SAW duration field;

the SAW start time offset field in an $i^{th}$ SAW allocation field indicates an offset time of a start moment of an $i^{th}$ adjustment period relative to a reference moment; and
the SAW duration field in the $i^{th}$ SAW allocation field indicates duration of the $i^{th}$ adjustment period.

6. The method according to claim 5, wherein the sending the control information to the STA comprises:

when another SAW sequence element needs to be sent to another STA at an originally determined moment for sending the SAW sequence element, sending the SAW sequence element to the STA after a delay of target duration relative to the originally determined sending moment.

7. The method according to claim 6, wherein the target duration is less than or equal to a preset threshold.

8. The method according to claim 1, wherein obtaining the time division scheme of a STA in a next cruise monitoring period comprises:

receiving, from a monitoring center device, cruise track configuration information corresponding to the next cruise monitoring period, wherein the cruise track configuration information comprises setting parameters of the N preset points; and
determining the time division scheme of the STA in the next cruise monitoring period according to the setting parameters of the N preset points.

9. The method according to claim 8, wherein a setting parameter of an $i^{th}$ preset point comprises a monitoring setting parameter and monitoring duration of the $i^{th}$ preset point; and determining the time division scheme of the STA in the next cruise monitoring period according to the setting parameters of the N preset points comprises:
determining the monitoring duration of the $i^{th}$ preset point as duration of an $i^{th}$ monitoring period for the STA in the next cruise monitoring period;
determining, according to a monitoring setting parameter of an $(i-1)^{th}$ preset point and the monitoring setting parameter of the $i^{th}$ preset point, an adjustment amount in which the STA is adjusted from the $(i-1)^{th}$ preset point to the $i^{th}$ preset point; and
calculating an adjustment time according to the adjustment amount and an adjustment rate; and determining the adjustment time as duration of an $i^{th}$ adjustment period for the STA in the next cruise monitoring period, wherein
when i=1, a monitoring setting parameter of a $0^{th}$ preset point is a current monitoring setting parameter of the STA.

10. A control apparatus, wherein the apparatus comprises hardware components including:

an obtaining unit, configured to obtain a time division scheme of a station STA in a next cruise monitoring period, wherein the next cruise monitoring period comprises N adjustment periods and N monitoring periods determined by means of division according to N preset points, and N is a positive integer;
a configuration unit, configured to configure control information according to the time division scheme, wherein the control information is for controlling an operating status of the STA in each adjustment period in the next cruise monitoring period; and
a sending unit, configured to send the control information to the STA.

11. The apparatus according to claim 10, wherein the configuration unit is configured to:

configure control information that a STA priority of the STA in the adjustment period is lower than a STA priority of the STA in the monitoring period, so that the STA sends, according to a low priority, a data frame generated in the adjustment period; and/or
configure control information that a frame discard policy indicated by the STA to an access point (AP) in the adjustment period is a policy indicating that a data frame can be discarded, so that when sending a data frame generated in the adjustment period, the STA indicates, to the AP, the policy indicating that a data frame can be discarded, and the AP selectively discards the data frame that is set to be discardable; and/or
configure control information that an ACK policy indicated by the STA to an AP in the adjustment period is a no-ACK policy or a block ACK policy, so that the STA indicates a no-ACK response or a block ACK response to the AP when sending a data frame generated in the adjustment period, and the AP makes no ACK response to the data frame for which the no-ACK response is set, or makes a block ACK response to the data frame for which the block ACK response is set; and/or
configure control information that a bit rate/frame rate of the STA in the adjustment period is less than a bit rate/frame rate of the STA in the monitoring period, so that the STA encodes, according to the bit rate/frame rate, monitoring information collected in the adjustment period.

12. The apparatus according to claim 11, wherein the control information comprises a station adjustment window SAW sequence element, the SAW sequence element comprising a SAW sequence control field, the SAW sequence control field comprising at least one of a STA priority field, a frame discard indicator bit field, an ACK policy field, or a bit rate/frame rate field, wherein the STA priority field indicates the STA priority of the STA in the adjustment period;
the frame discard indicator bit field indicates the frame discard policy set by the STA for the data frame generated in the adjustment period;
the ACK policy field indicates the ACK policy set by the STA for the data frame generated in the adjustment period; and
the bit rate/frame rate field indicates a video coding bit rate/frame rate or an audio coding bit rate/frame rate used by the STA for the monitoring information collected in the adjustment period.

13. The apparatus according to claim 10, wherein the hardware components in the apparatus further comprise:

a scheduling unit, configured to schedule, to the STA in the adjustment period, a channel access period whose allocation type is a dynamic service period DSP, so that the STA sends, to the AP by using the DSP, a data frame generated in the adjustment period, wherein
a proportion of a DSP, scheduled and allocated to the STA in the adjustment period, to an SP is greater than a proportion of a DSP, scheduled and allocated to the STA in the monitoring period, to an SP.

14. The apparatus according to claim 10, wherein the control information comprises a station adjustment window SAW sequence element, the SAW sequence element comprising N SAW allocation fields, each SAW allocation field comprising a first one or both of a SAW start time offset field and a SAW duration field;

the SAW start time offset field in an $i^{th}$ SAW allocation field indicates an offset time of a start moment of an $i^{th}$ adjustment period relative to a reference moment; and the SAW duration field in the $i^{th}$ SAW allocation field indicates duration of the $i^{th}$ adjustment period.

15. The apparatus according to claim 14, wherein the sending unit is specifically configured to:

when another SAW sequence element needs to be sent to another STA at an originally determined moment for sending the SAW sequence element, send the SAW sequence element to the STA after a delay of target duration relative to the originally determined sending moment.

16. The apparatus according to claim 15, wherein the target duration is less than or equal to a preset threshold.

17. The apparatus according to claim 10, wherein the obtaining unit is specifically configured to:

receive, from a monitoring center device, cruise track configuration information corresponding to the next cruise monitoring period, wherein the cruise track configuration information comprises setting parameters of the N preset points; and determine the time division scheme of the STA in the next cruise monitoring period according to the setting parameters of the N preset points.

18. The apparatus according to claim 17, wherein a setting parameter of an $i^{th}$ preset point comprises a monitoring setting parameter and monitoring duration of the $i^{th}$ preset point; and the obtaining unit is configured to:

determine the monitoring duration of the $i^{th}$ preset point as duration of an $i^{th}$ monitoring period for the STA in the next cruise monitoring period;

determine, according to a monitoring setting parameter of the $(i-1)^{th}$ preset point and the monitoring setting parameter of the $i^{th}$ preset point, an adjustment amount in which the STA is adjusted from the $(i-1)^{th}$ preset point to the $i^{th}$ preset point; and calculate an adjustment time according to the adjustment amount and an adjustment rate; and determine the adjustment time as duration of an $i^{th}$ adjustment period for the STA in the next cruise monitoring period, wherein when i=1, a monitoring setting parameter of a $0^{th}$ preset point is a current monitoring setting parameter of the STA.

19. A network controller, wherein the network controller comprises a processor, a memory, and a transceiver, the memory is configured to store one or more instructions, and the instruction is configured to be executed by the processor;

the processor is configured to obtain a time division scheme of a station STA in a next cruise monitoring period, wherein the next cruise monitoring period comprises N adjustment periods and N monitoring periods determined by means of division according to N preset points, and N is a positive integer;

the processor is further configured to configure control information according to the time division scheme, wherein the control information is for controlling an operating status of the STA in each adjustment period in the next cruise monitoring period; and the processor is further configured to control the transceiver to send the control information to the STA.

20. The network controller according to claim 19, wherein the processor is specifically configured to:

configure control information that a STA priority of the STA in the adjustment period is lower than a STA priority of the STA in the monitoring period, so that the STA sends, according to a low priority, a data frame generated in the adjustment period; and/or configure control information that a frame discard policy indicated by the STA to an access point (AP) in the adjustment period is a policy indicating that a data frame can be discarded, so that when sending a data frame generated in the adjustment period, the STA indicates, to the AP, the policy indicating that a data frame can be discarded, and the AP selectively discards the data frame that is set to be discardable; and/or configure control information that an ACK policy indicated by the STA to an AP in the adjustment period is a no-ACK policy or a block ACK policy, so that the STA indicates a no-ACK response or a block ACK response to the AP when sending a data frame generated in the adjustment period, and the AP makes no ACK response to the data frame for which the no-ACK response is set, or makes a block ACK response to the data frame for which the block ACK response is set; and/or configure control information that a bit rate/frame rate of the STA in the adjustment period is less than a bit rate/frame rate of the STA in the monitoring period, so that the STA encodes, according to the bit rate/frame rate, monitoring information collected in the adjustment period.

21. The network controller according to claim 20, wherein the control information comprises a station adjustment window SAW sequence element, the SAW sequence element comprises a SAW sequence control field, and the SAW sequence control field comprises at least one of a STA priority field, a frame discard indicator bit field, an ACK policy field, or a bit rate/frame rate field, wherein the STA priority field indicates the STA priority of the STA in the adjustment period;

the frame discard indicator bit field indicates the frame discard policy set by the STA for the data frame generated in the adjustment period;

the ACK policy field indicates the ACK policy set by the STA for the data frame generated in the adjustment period; and the bit rate/frame rate field indicates a video coding bit rate/frame rate or an audio coding bit rate/frame rate used by the STA for the monitoring information collected in the adjustment period.

22. The network controller according to claim 19, wherein the processor is further configured to:

schedule, to the STA in the adjustment period, a channel access period whose allocation type is a dynamic service period DSP, so that the STA sends, to an access point (AP) by using the DSP, a data frame generated in the adjustment period, wherein a proportion of a DSP, scheduled and allocated to the STA in the adjustment period, to an SP is greater than a proportion of a DSP, scheduled and allocated to the STA in the monitoring period, to an SP.

23. The network controller according to claim 19, wherein the control information comprises a station adjustment window SAW sequence element, the SAW sequence element comprising N SAW allocation fields, each SAW allocation field comprising a first one or both of a SAW start time offset field and a SAW duration field;

the SAW start time offset field in an $i^{th}$ SAW allocation field indicates an offset time of a start moment of an $i^{th}$ adjustment period relative to a reference moment; and the SAW duration field in the $i^{th}$ SAW allocation field indicates duration of the $i^{th}$ adjustment period.

24. The network controller according to claim 23, wherein the processor is configured to:

when another SAW sequence element needs to be sent to another STA at an originally determined moment for sending the SAW sequence element, send the SAW sequence element to the STA after a delay of target duration relative to the originally determined sending moment.

25. The network controller according to claim 24, wherein the target duration is less than or equal to a preset threshold.

26. The network controller according to claim 19, wherein the processor is specifically configured to:

receive, from a monitoring center device, cruise track configuration information corresponding to the next cruise monitoring period, wherein the cruise track configuration information comprises setting parameters of the N preset points; and determine the time division scheme of the STA in the next cruise monitoring period according to the setting parameters of the N preset points.

27. The network controller according to claim 26, wherein a setting parameter of an $i^{th}$ preset point comprises a monitoring setting parameter and monitoring duration of the $i^{th}$ preset point; and the processor is configured to:

determine the monitoring duration of the $i^{th}$ preset point as duration of an $i^{th}$ monitoring period for the STA in the next cruise monitoring period;

determine, according to a monitoring setting parameter of the $(i-1)^{th}$ preset point and the monitoring setting parameter of the $i^{th}$ preset point, an adjustment amount in which the STA is adjusted from the $(i-1)^{th}$ preset point to the $i^{th}$ preset point; calculate an adjustment time according to the adjustment amount and an adjustment rate; and determine the adjustment time as duration of an $i^{th}$ adjustment period for the STA in the next cruise monitoring period, wherein when i=1, a monitoring setting parameter of a $0^{th}$ preset point is a current monitoring setting parameter of the STA.

* * * * *